United States Patent Office 2,742,408
Patented Apr. 17, 1956

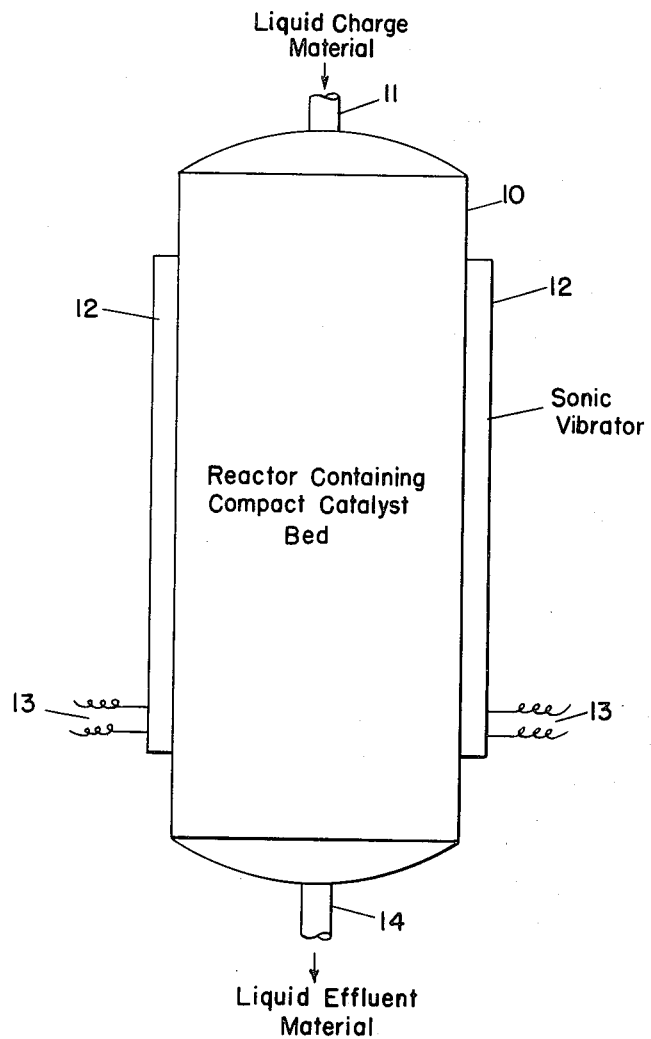

2,742,408

CATALYTIC REACTION PROCESS

Walter N. La Porte, Melrose, Mass., assignor to Sun Oil Company, Philadelphia, Pa., a corporation of New Jersey Application April 24, 1952, Serial No. 284,195

4 Claims. (Cl. 196—78)

This invention relates to catalytic reactions wherein a liquid material and a gaseous reactant are contacted with granular solid catalytic material in a reaction zone.

It is known to conduct catalytic reactions involving gaseous reactants and solid catalytic material in the presence of a liquid material which forms liquid films on the surface of the catalyst particles. This is the case, for example, in catalytic hydrogenations of liquid materials by flowing the latter in liquid phase in the presence of hydrogen through a mass of granular solid hydrogenation catalyst, or by flowing a slurry of catalyst in liquid material in the presence of hydrogen through a reaction zone.

In such processes, it is necessary, in order for the catalytic reaction to take place and for the reaction products to be separated from the catalyst, that the gaseous reactant diffuse through the liquid film on the catalyst particles to the surfaces of the catalyst particles, and that the reaction products diffuse through the liquid film away from the catalyst surfaces.

In previous processes of the types described above, the liquid film on each catalyst particle offers substantial resistance to the diffusion of gaseous reactants through the film to the catalyst surface, and offers substantial resistance to the diffusion of reaction products through the film and away from the catalyst surface. In contact catalysis, where the desired reaction occurs at the surfaces of the catalyst particles, this film resistance results in a disadvantageous limitation of the reaction rate.

According to the present invention, this disadvantage of prior art processes is minimized or eliminated by continuously subjecting gaseous reactants and catalyst particles having liquid films thereon to the action of sonic vibrations having a frequency of at least 1000 cycles per second. Sonic vibrations, as the term is used herein, include vibrations having frequencies within the audible range, i. e. up to about 20,000 cycles per second, and also ultrasonic vibrations having frequencies above the audible range, i. e. above about 20,000 cycles per second; generally, there is no particular advantage in using vibrations having frequencies above about 30,000 cycles per second.

The result of such operation according to the invention is to substantially reduce or to eliminate the effect of liquid film resistance on the reaction rate and therefore to substantially increase the rate of passage of reactants to the catalyst surface, the rate of passage of reaction products away from the catalyst surface, and the overall rate of reaction as manifested in the rates of supply and withdrawal of reactants and reaction products respectively to the reaction zone.

The vibration which is according to the invention applied to the materials in the reaction zone can be generated in any suitable known manner for generating sonic or ultrasonic vibrations. The vibrations can be generated by the piezoelectric effect, or by the magnetostrictive effect, or by the effect of a gas being forced in pulses through holes which are very rapidly opened and closed, as by means of a rotating member having teeth which alternately cover and leave open the holes in an adjacent stator, or in any other suitable way. The apparatus which generates the sonic waves is mounted adjacent to or integral with the side-wall of the reaction chamber in which the liquid material, catalyst and gaseous reactant are contacted, and the vibrations generated are transmitted through the walls of the reaction chamber to the materials in the reaction chamber. The vibrations are transmitted to the materials over a substantial portion, e. g. a major proportion of the vertical extent of the reaction zone, and preferably over the entire vertical extent thereof. The compression waves which are set up in the flowing liquid are preferably of the traveling wave type.

The invention is particularly useful in conducting various non-destructive hydrogenations of hydrocarbon-containing materials. For example, it can be used in the hydrogenation of gasoline or kerosene for improvement of color and stability thereof; or in the hydrogenation of individual unsaturated hydrocarbons or mixtures thereof, such as olefin polymers; or in the hydrogenation of catalytic gas oil to improve the cetane number thereof, or to improve the gas oil as a charge to a subsequent catalytic cracking operation. Such hydrogenations are frequently conducted by contacting hydrogen in a reaction zone with granular solid catalyst having on the catalyst particles, films of the liquid material to be hydrogenated. For example, it is known to percolate hydrocarbon-containing liquid material in the presence of hydrogen through a compact bed of solid hydrogenation catalyst, the liquid material forming liquid films on the catalyst particles. In order for the catalytic hydrogenation reaction to take place, hydrogen must diffuse through the liquid film to the catalyst surface, and also the material to be hydrogenated must diffuse from the main catalyst stream through the liquid film to the catalyst surface; the hydrogenation products must then diffuse from the catalyst surface through the liquid film to the main liquid stream. According to the present invention, the resistance of the liquid film to such diffusion is minimized or eliminated by application of the sonic or ultrasonic vibration to the reaction zone, with the result that the hydrogenation rate is greatly increased over that obtainable in the absence of the sonic or ultrasonic vibrations.

The invention will be further described with reference to the drawing which is a schematic diagram of one embodiment of the process. In the process of the drawing, a granular catalytic material is disposed as a compact bed within catalytic reaction vessel 10. Reactant materials, e. g. liquid mineral oil and hydrogen, are introduced into vessel 10 through line 11 and pass downwardly through the compact catalyst bed therein. The mineral oil forms a liquid film on the catalyst surfaces and within the pores of the catalyst particles. The vibrators 12, which may be, for example, of the magnetostrictive type, are vibrated by electric current supplied through leads 13, and the vibrations are transmitted to the wall of vessel 10 and thence to the materials therein. The diffusion of the hydrogen and of the reactant constituents of the oil to the catalyst surface and into the catalyst pores is accelerated by the vibrative forces to which the liquid film is subjected. The hydrogen and reactant constituents react at the active centers within the catalyst pores, and the reaction products diffuse again to the flowing liquid stream, the diffusion being accelerated by the vibrative forces to which the liquid film is subjected. The reaction products are removed from vessel 10 through line 14.

The process of the invention is particularly useful in that it permits the use of lower gas pressures in the reaction zone. For example, in hydrogenation processes where the liquid to be hydrogenated is percolated, e. g.

t a space rate within the approximate range 0.1 to 10 volumes of liquid per volume of catalyst bed per hour in the presence of hydrogen through a catalyst bed, it has previously been necessary in order to get a satisfactory reaction rate to use a high hydrogen pressure in the conversion zone; otherwise, the rate of diffusion of hydrogen through the liquid film to the catalyst surface is too low to provide a satisfactory reaction rate. The process of the invention, however, brings about a large reduction or elimination of the resistance of the liquid film to the diffusion of hydrogen to the catalyst surface, and thus makes it possible to obtain high reaction rates with low hydrogen pressures, e. g. pressures within the approximate range 200 p. s. i. g. to 2000 p. s. i. g.

The process of the invention also permits the use of generally lower temperatures in catalytic reactions. In reactions such as the hydrogenation of catalytic gas oil to improve the latter as charge stock for re-cracking, the possibility of using lower temperatures is particularly important since it enables the reaction to be conducted at temperatures, e. g. 450° F. to 700° F., below those at which there is substantial deposition of carbonaceous contaminants on the catalyst, whereas in the absence of sonic or ultrasonic vibrations, it is frequently necessary, in order to obtain a satisfactory reaction rate, to use temperatures at which there is substantial deposition of carbonaceous contaminants on the catalyst.

The process of the invention is applicable generally to prior art processes wherein gaseous reactants are contacted with granular solid catalyst having on each catalyst particle a liquid film through which the gaseous reactant must diffuse to the catalyst surface in order for the catalytic reaction to be effected, and through which the reaction products must diffuse in order to be ultimately separated from the catalyst. In such processes, where liquid is flowed through a catalyst mass, the catalyst mass may be compact, as in the case of downflow of liquid through a compact catalyst bed, or the catalyst mass may be nearly compact, as in the case of upflow of liquid with slight levitation of the catalyst particles, or the catalyst mass may be substantially dispersed, as in the case where the catalyst particles are carried upwardly in the reaction zone a substantial distance and are subjected to hindered settling.

Although the invention has been thus far described with reference to processes wherein the liquid material comprises reactant material it is to be understood that the invention is also applicable to processes wherein the liquid does not itself comprise reactant material, but is employed for example, as a medium in which to suspend the catalyst. An example of such process is that wherein gaseous reactants, e. g. carbon monoxide and hydrogen, are contacted with granular solid catalyst in the presence of a liquid material to effect synthesis of hydrocarbon material, as disclosed for example in U. S. Patent 2,438,029 to Harold V. Atwell.

It is noted that in processes according to the invention where the liquid material in the reaction zone comprises reactant material, the sonic or ultrasonic vibration aids in the passage of liquid reactant material from the main body or stream of liquid material to the catalyst surfaces, in addition to aiding in the passage of gaseous reactants to the catalyst surfaces. It is further to be noted that the effect of the sonic or ultrasonic vibrations employed according to the invention in aiding the passage of reactants through liquid films applies to all liquid films associated with the catalyst, including not only the peripheral liquid film associated with each catalyst particle, but also the liquid material contained within the pores of each particle, the latter liquid material having a significant limiting effect in prior art catalytic reaction processes.

Although the invention has been described with reference to hydrogenation processes, it is to be understood that it can advantageously be applied to other catalytic processes, such as oxidation of liquid material with solid catalyst, etc.

The invention claimed is:

1. Process for conducting catalytic reactions which comprises: contacting a gaseous reactant in a reaction zone under reaction conditions with solid catalyst particles having liquid films on the surfaces thereof; and continuously subjecting said gaseous reactant and said catalyst to sonic vibrations having frequency of at least 1000 cycles per second.

2. Process for catalytic non-destructive hydrogenation of hydrocarbon-containing material which comprises: continuously percolating said material in liquid phase in the presence of hydrogen under non-destructive hydrogenation conditions through a fixed compact bed of hydrogenation catalyst particles within a conversion zone; and continuously subjecting the liquid hydrocarbon-containing material, catalyst, and hydrogen within said conversion zone to the action of sonic vibrations having frequency of at least 1000 cycles per second.

3. Process according to claim 1 wherein said vibrations have frequency above the audible range.

4. Process for catalytic, non-destructive hydrogenation of catalytic gas oil obtained in catalytic cracking of virgin gas oil which comprises: continuously percolating said catalytic gas oil in liquid phase in the presence of hydrogen under pressure within the range 200 to 2000 p. s. i. g. through a fixed compact bed of solid hydrogenation catalyst particles within a conversion zone, the temperature in said conversion zone being maintained within the range 450° F. to 700° F., and the rate of percolation being within the range 0.1 to 10 volumes of recycle stock per volume of catalyst bed per hour; and continuously subjecting the catalytic gas oil, hydrogen, and catalyst within said conversion zone to the action of sonic vibrations having frequency above the audible range.

References Cited in the file of this patent

UNITED STATES PATENTS

| | | |
|---|---|---|
| 2,303,118 | Frey | Nov. 24, 1942 |
| 2,365,751 | Drennan | Dec. 26, 1944 |
| 2,500,008 | Richardson | Mar. 7, 1950 |
| 2,578,377 | Smith | Dec. 11, 1951 |